United States Patent [19]

Someya

[11] Patent Number: 4,845,549
[45] Date of Patent: Jul. 4, 1989

[54] APPARATUS FOR SELECTIVELY PRODUCING A POSITIVE MULTI-COLOR PRINT AND NEGATIVE COLOR SEPARATION FILMS OR POSITIVE AND NEGATIVE COLOR SEPARATION FILMS USING A MULTI-COLOR THERMAL TRANSFER INK RIBBON

[75] Inventor: Akihiko Someya, Yokohama, Japan

[73] Assignee: Kabushiki Kaisha Toshiba, Kawasaki, Japan

[21] Appl. No.: 84,157

[22] Filed: Aug. 12, 1987

[30] Foreign Application Priority Data

Aug. 15, 1986 [JP] Japan .................................. 61-190597

[51] Int. Cl.$^4$ .......................... H04N 1/46; G03F 3/08
[52] U.S. Cl. ........................................ 358/75; 358/80
[58] Field of Search ....................... 358/75.75 IS, 78.80

[56] References Cited

U.S. PATENT DOCUMENTS

| | | | |
|---|---|---|---|
| 4,485,413 | 11/1984 | Furuta et al. | 358/75 |
| 4,511,902 | 4/1985 | Nagashima | 346/76 PH |
| 4,531,135 | 7/1985 | Toshima | 346/76 PH |
| 4,668,978 | 5/1987 | Gokita | 358/75 |

Primary Examiner—James J. Groody
Assistant Examiner—Randall S. Svihla
Attorney, Agent, or Firm—Cushman, Darby & Cushman

[57] ABSTRACT

In one embodiment, a thermal-transfer type color copying machine produces a positive multi-color print on paper using a thermal transfer ink ribbon having yellow, magenta, cyan, and black ink portions by driving a thermal head in accordance with yellow, magenta, cyan, and black image signals obtained by scanning an original. The used ribbon, which now contains negative yellow, magenta, cyan, and black ink images, is rewound and the thermal head is driven at full power to produce yellow, magenta, cyan, and black negative color separation films on plastic film. At this point, all of the ink on the thermal transfer ink ribbon has been used, and no ink images remain on the ribbon. In another embodiment, yellow, magenta, cyan, and black positive color separation films are produced on plastic film instead of producing a positive multi-color print on paper. The positive and negative color separations may be produced as prints on paper if desired.

19 Claims, 8 Drawing Sheets

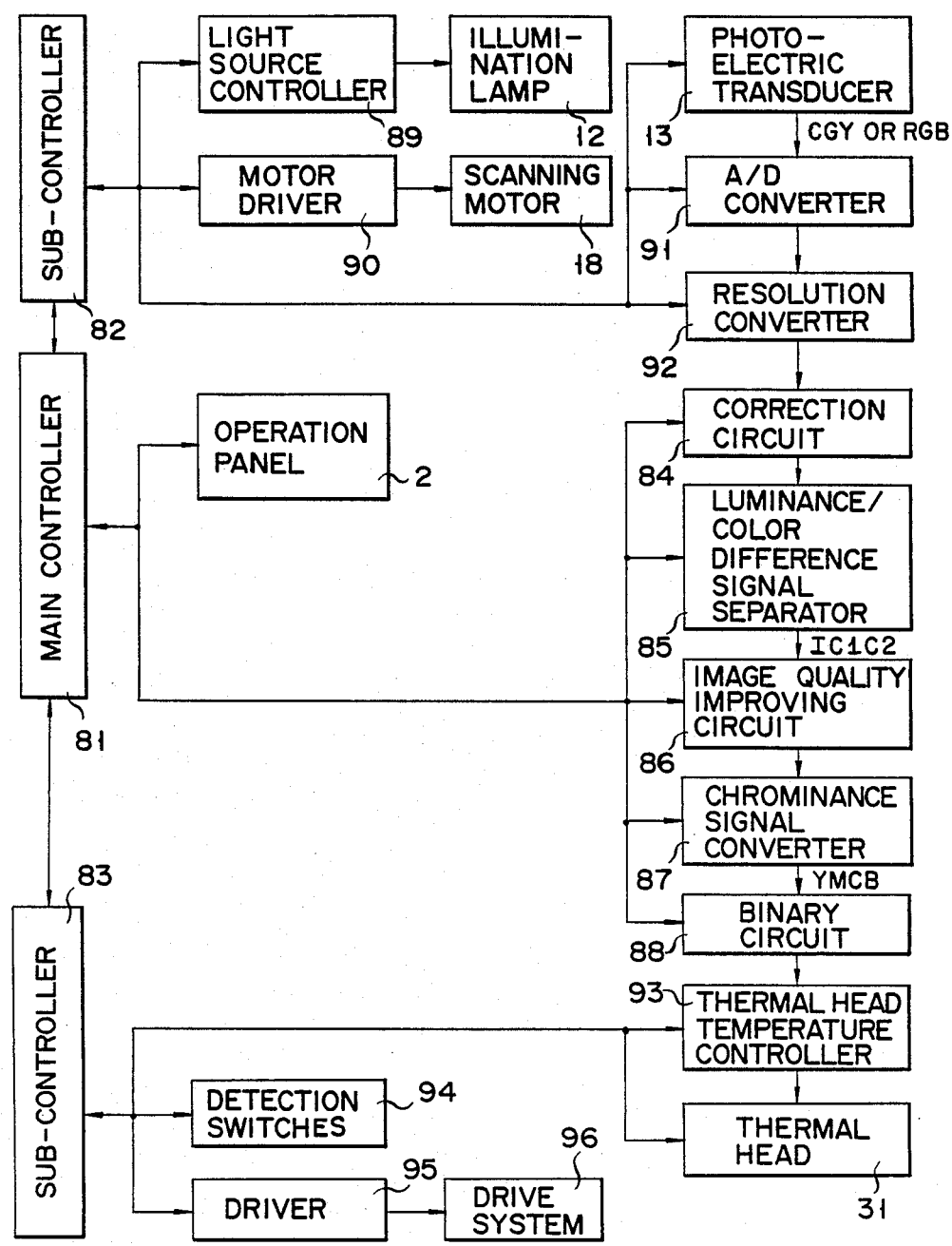
F I G. 9

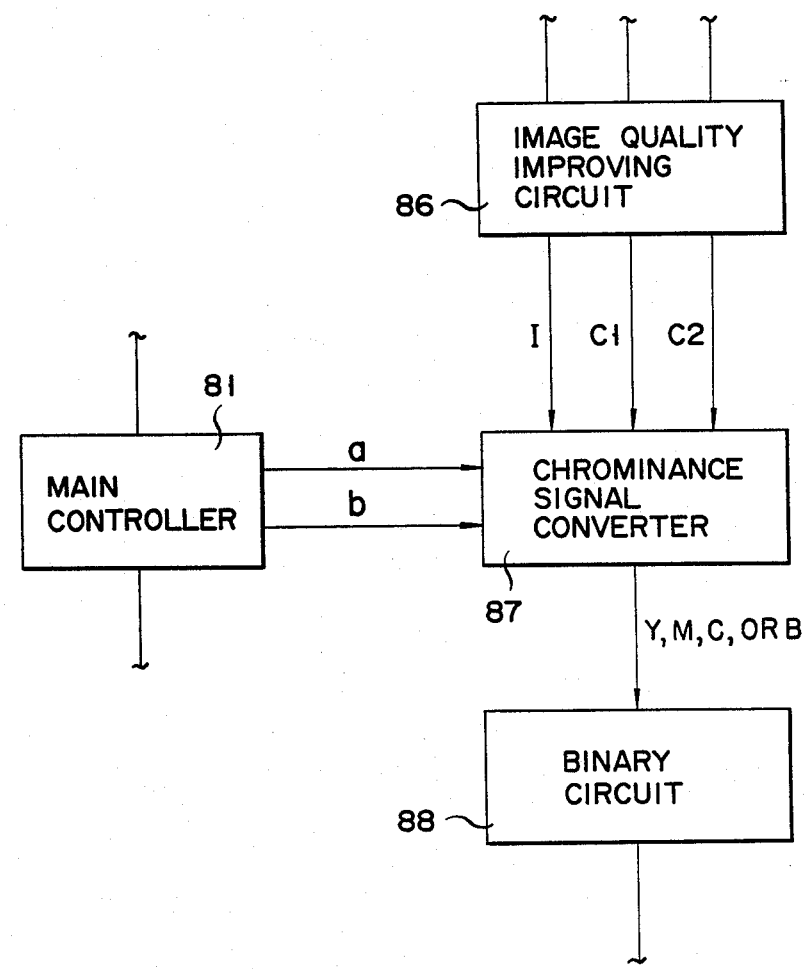
F I G. 10

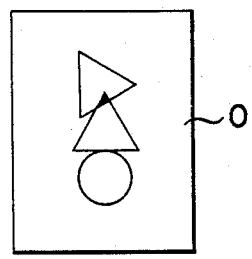
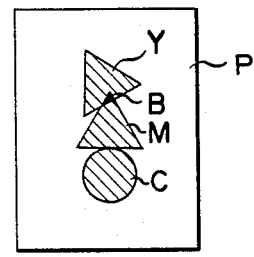
FIG. 12A    FIG. 12B
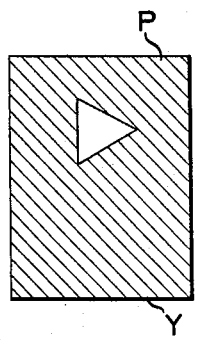 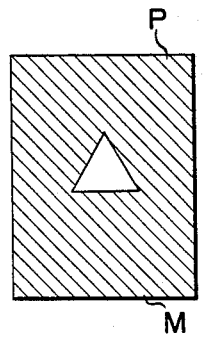 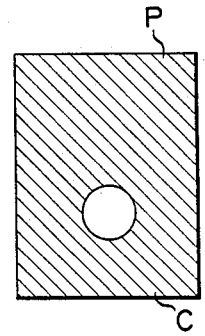 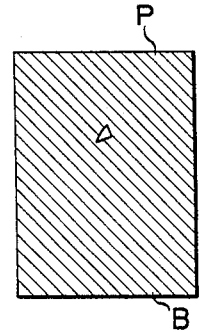
FIG. 12C    FIG. 12D    FIG. 12E    FIG. 12F
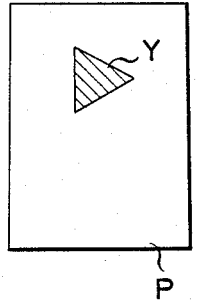 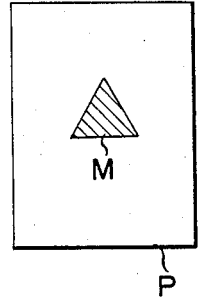 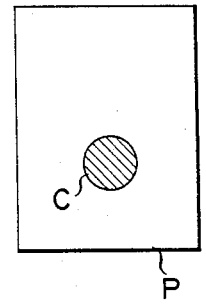 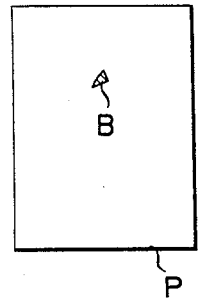
FIG. 13A    FIG. 13B    FIG. 13C    FIG. 13D

APPARATUS FOR SELECTIVELY PRODUCING A POSITIVE MULTI-COLOR PRINT AND NEGATIVE COLOR SEPARATION FILMS OR POSITIVE AND NEGATIVE COLOR SEPARATION FILMS USING A MULTI-COLOR THERMAL TRANSFER INK RIBBON

BACKGROUND OF THE INVENTION

The present invention relates to a method and apparatus for obtaining negative and positive images and, more particularly, to a technique utilizing an image-forming apparatus for forming color-separated original images necessary for forming a press form for offset printing.

Along with recent developments in electronics, photoengraving techniques have advanced remarkably, and electronic photoengraving is the leading trend. In the electronic photoengraving, the gray scale levels of an original image are photoelectrically converted to an electrical signal, and the electrical signal is subjected to predetermined processing to be converted to light of variable intensities. A film (photosensitive material) is exposed to light of variable intensities, and is developed to form a negative or positive film serving as a press form.

However, this method requires very complicated processes, and a machine therefor becomes bulky, resulting in very high cost. Conventionally, the machine is used only for forming press forms, and cannot be used in other applications.

Another method is proposed wherein films (block copies) for forming press forms for each of a plurality of colors are formed by a transfer type color copying machine.

With this method, however, it is difficult to check colors (i.e., in the finished image) when a press form is formed in practice by the films (block copies) and printing is performed using this press form.

For example, in a thermal transfer type color copying machine, a thermal transfer ink ribbon having yellow, magenta, cyan, and black portions is used to form color-separated original images on films. Thus, actual print colors can be known only after the print colors of all the films (in this case, four films) for press forms for the respective colors are mixed. The same problem is posed if the film to be formed is either a negative or positive film.

The thermal transfer ink ribbon is normally disposed after being used for forming a negative or positive film. However, its disposal poses many important problems.

First, the disposed ribbon may be misused by a third party unless its disposal is carefully managed. Since the thermal transfer ink ribbon used for formation of a negative or positive film has film formation information, i.e., press form information, highly confidential information may be disclosed to a malicious third party.

Second, it is unpreferable from the viewpoint of effective use of resources that the used thermal transfer ink ribbon is simply disposed.

When both the negative and positive films must be formed for a single original, the amount of the thermal transfer ink ribbon used is twice that in the case wherein either one film is formed, thus causing a still further unpreferable result.

SUMMARY OF THE INVENTION

It is, therefore, an object of the present invention to provide a new and improved method and apparatus for obtaining negative and positive images which can be obtained from a unit amount of a transfer medium, so that even if a used transfer medium is disposed, confidential information cannot be disclosed to any third party, unlike in the conventional case, and which can contribute to an effective use of resources.

It is another object of the present invention to provide an image-forming apparatus which can form films for forming a press form and in which an actual finished image formed by the films for the press form can be inspected upon film formation.

According to one aspect of the present invention, there is provided a positive and negative image forming apparatus comprising:

color image data output means for outputting color image data including image forming signal components of a plurality of colors in correspondence with positive and negative images to be formed;

image forming means for selectively transferring a positive or negative image corresponding to the image data onto first and second predetermined numbers of image forming media using a transfer medium of a plurality of colors corresponding to the image forming signal components;

first control means, coupled to the image data output means and the image forming means, for, in a first image formation mode of the image forming means, outputting a first predetermined number of control signals for transferring, as the positive or negative images, the image data from the image output means on the first predetermined number of image forming media by predetermined color portions of the transfer medium; and second control means, coupled to the image data output means and the image forming means, for, in a second-image formation mode of the image forming means, outputting a second predetermined number of control signals for transferring, as the negative or positive images, the image data from the image data output means onto the second predetermined number of image forming media by the same predetermined color portions of the transfer medium.

BRIEF DESCRIPTION OF THE DRAWINGS

These and other objects and features of the present invention can be understood through the following description of an embodiment by reference to the accompanying drawings, in which:

FIGS. 1 to 12F are for explaining a first embodiment of the present invention, in which FIG. 1 is a partially cutaway schematic perspective view of the overall arrangement, FIG. 2 is a perspective view schematically showing the outer appearance of the overall arrangement, FIG. 3 is a side view schematically showing the arrangement of an original scanning section, FIG. 4 is a perspective view showing a scanner moving mechanism of the original scanning section, FIG. 5 is a longitudinal sectional view schematically showing the arrangement of an image forming section, FIG. 6 is a perspective view for explaining a transfer operation mode, FIG. 7 is a plan view showing the arrangement of a thermal transfer ink ribbon, FIG. 8 is a plan view of an operation panel, FIG. 9 is a block diagram schematically showing the entire control system, FIG. 10 is a block diagram for explaining in detail a chrominance signal converter, FIG. 11 is a flow chart for explaining the operation, FIGS. 12A to 12F are views showing an original, a finished image, and negative films for forming a press form; and FIGS. 13A to 13D are views showing positive films for forming a press form as a principal part of a second embodiment of the present invention.

DETAILED DESCRIPTION OF THE PREFERRED EMBODIMENTS

The first embodiment of the present invention will now be described with reference to the accompanying drawings.

Figure 1:
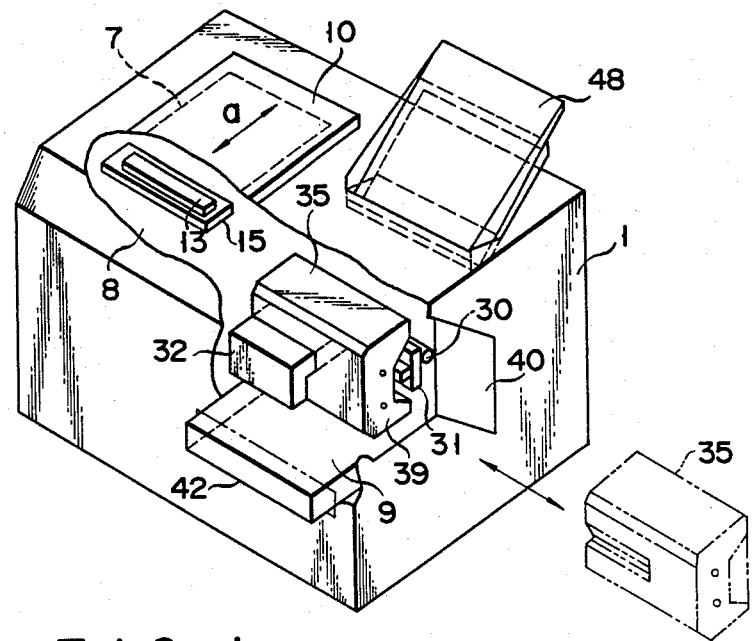
Figure 2:
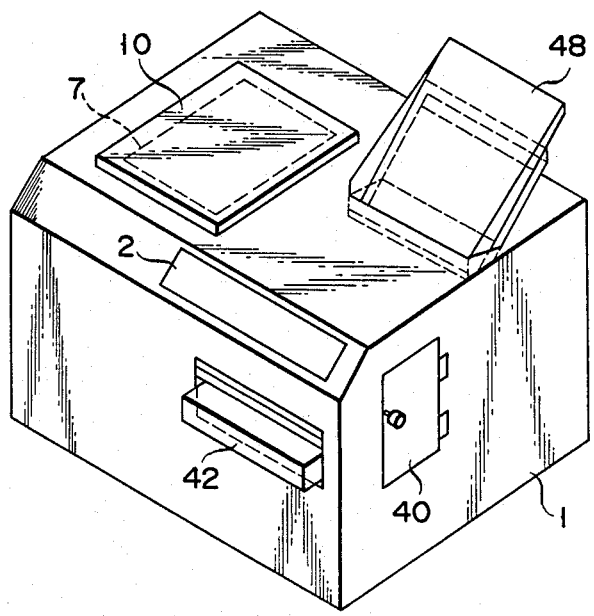

FIGS. 1 and 2 show a thermal transfer color copying machine capable of selectively performing a multi-color copying operation and forming press form films as an embodiment of an image forming apparatus according to the present invention. More specifically, reference numeral 1 denotes a copying machine body. Operation panel 2 is arranged on a front portion of the upper surface of body 1. Original scanning section 8 for scanning an original set on original table 7 is arranged in a left portion of body 1, and image forming section 9 is arranged in a right portion thereof. Note that reference numeral 10 denotes a cover which is pivotally arranged on original table 7.

Figure 3:
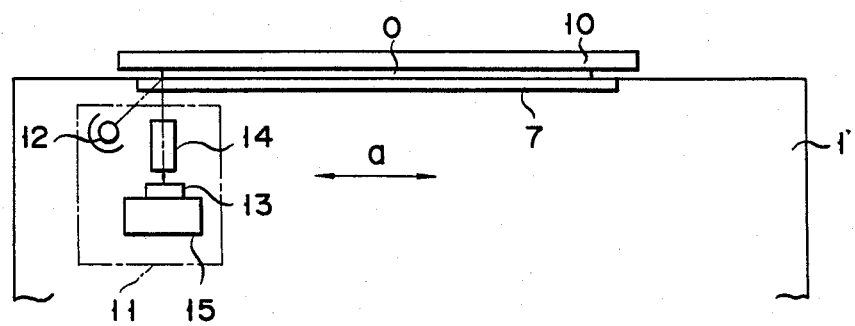
Figure 4:
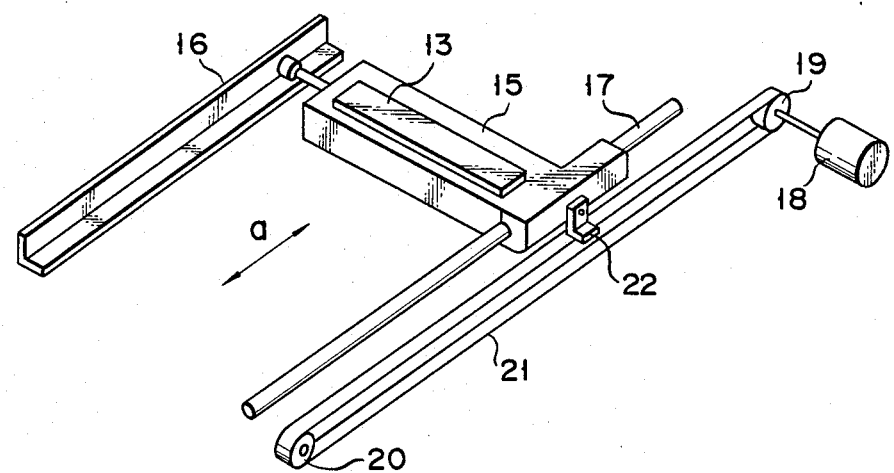

Original scanning section 8 is arranged as shown in FIGS. 3 and 4. More specifically, original table 7 is fixed to body 1, and scanner 11 for optically scanning original O set on table 7 upon reciprocal movement in a direction indicated by arrow a along the lower surface of table 7 is arranged below table 7. Scanner 11 comprises illumination lamp 12 for illuminating original O, photoelectric transducer 13 for receiving light reflected by original O, optical system 14 for guiding the light reflected by original O toward photoelectric transducer 13, and carriage 15 for supporting these components. Transducer 13 photoelectrically converts light reflected by original O so as to separate and output the colors of an image on original O as cyan, green, and yellow (or red, green, and blue) chrominance signals. Transducer 13 mainly consists of a CCD line image sensor. Carriage 15 is guided by guide rail 16 and guide shaft 17 to be reciprocal in the direction indicated by arrow a, as shown in FIG. 4. Drive pulley 19, which is driven by scanning motor (e.g., pulse motor) 18, is capable of rotating in both the forward and reverse directions and is disposed at one end side of guide shaft 17. Driven pulley 20 is disposed at the other end side of shaft 17. Timing belt 21 is looped between these pulleys 19 and 20. Timing belt 21 is fixed at one point to carriage 15 through fixing member 22. With this arrangement, when scanning motor 18 is rotated in the forward or reverse direction, carriage 15 is moved linearly.

Figure 5:
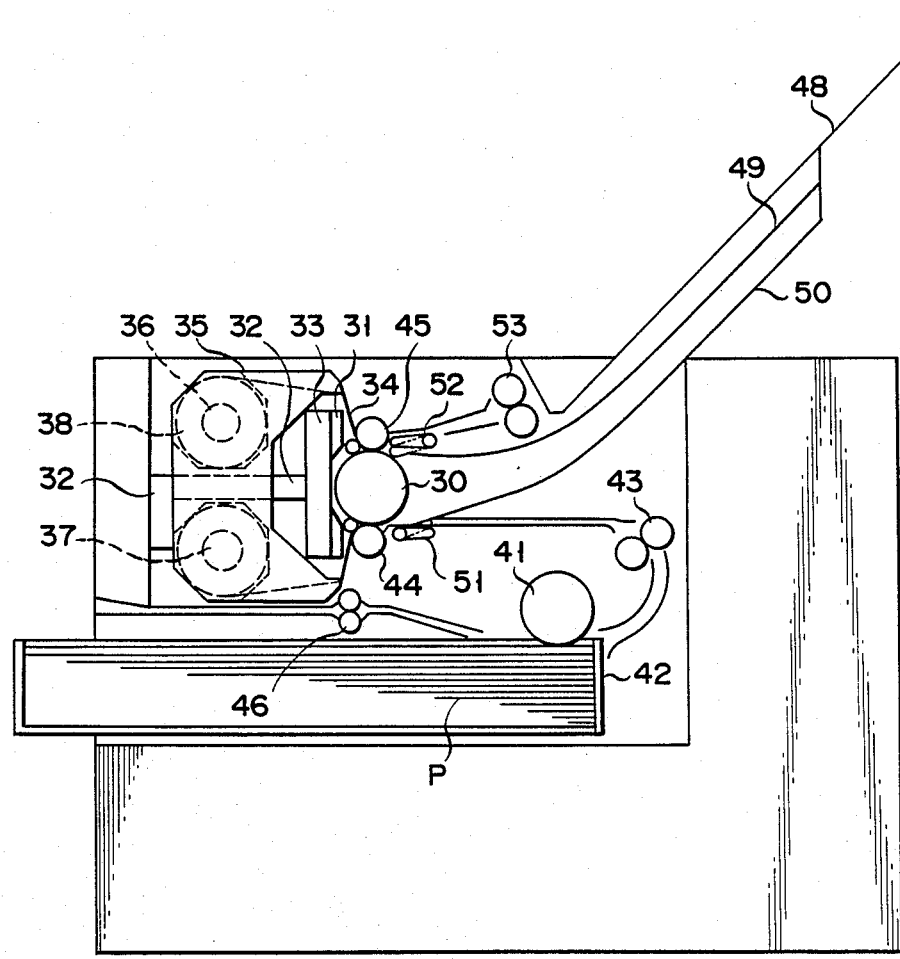

Image forming section 9 is arranged as shown in, e.g., FIG. 5. More specifically, platen 30 is arranged at substantially the central portion of image forming section 9, and thermal head 31 is arranged in a left side portion facing platen 30. Thermal head 31 is attached to radiator 33 integrally formed on the rear end face of holder 32. Ribbon cassette 35 storing thermal transfer ink ribbon 34 as an image forming medium is detachably mounted through holder 32, so that ribbon 34 is interposed between thermal head 31 and platen 30. As shown in FIG. 5, ribbon cassette 35 has two parallel rolls 36 and 37 around which two end portions of thermal transfer ink ribbon 34 are wound. Ribbon cassette 35 is enclosed in case 38 to be partially exposed therefrom so that an intermediate portion of ribbon 34 is interposed between platen 30 and thermal head 31. Rolls 36 and 37 are coupled to the drive shafts of motors (not shown) through a drive force transmission mechanism (not shown) when cassette 35 is attached, and are rotated as needed. Cassette 35 can be attached to or detached from holder 32 through insertion port 39 formed in the right side surface of body 1. Note that openable/closable lid 40 is arranged on port 39.

Paper feed roller 41 is arranged at the right side and obliquely below platen 30 so as to pick up, one by one, paper sheet (or plastic film) P as a medium on which an image is to be formed and which is stored in paper cassette 42. Paper sheet P picked up by roller 41 is fed to register rollers 43, disposed at the right side and obliquely upward of roller 41, to be registered, Thereafter, paper sheet P is conveyed toward platen 30 by register rollers 43 to be wound around platen 30 by press rollers 44 and 45, thus allowing precise feeding. Note that paper cassette 42 can be attached to or detached from the front side of body 1. Reference numeral 46 in FIG. 5 denotes a manual feed device for manually feeding paper sheet P.

Figure 6:
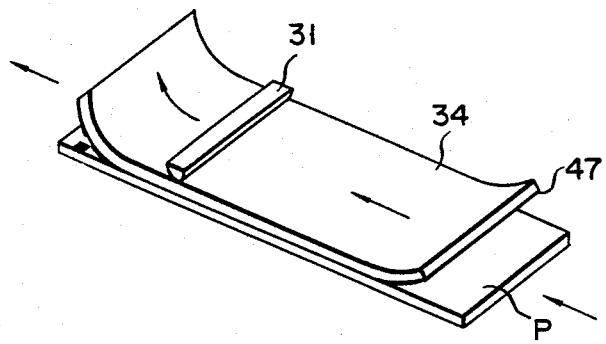
Figure 7:
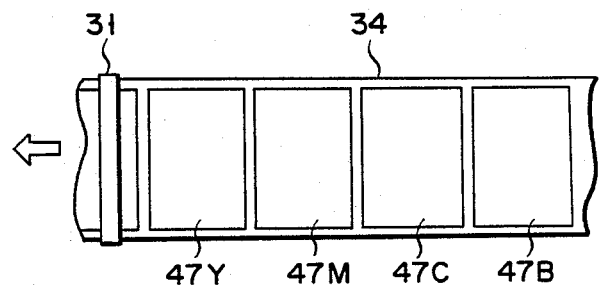

Thermal head 31 urges paper sheet P against platen 30 through ink ribbon 34, and melts and transfers ink 47 by heat as a color agent on ribbon 34 onto sheet P. Ink ribbon 34 is constituted by yellow, magenta, cyan, and black ink portions 47Y, 47M, 47C, and 47B having substantially the same width as that of paper sheet P in the order named, as shown in FIGS. 6 and 7. Each time a color of ink is transferred to paper sheet P, sheet P is returned to the transfer start position, so that the respective colors are precisely superimposed on each other. Note that ink ribbon 34 need not have black ink portion 47B, and a substantially black color can be formed by overlapping yellow, magenta, and cyan.

Upon color copying, an image is formed on single paper sheet P using ink portions 47Y, 47M, 47C, and 47B of ribbon 34 as described above. In contrast to this, when films for forming a press form are formed, an image is formed on separate paper sheets P respectively using ink portions 47Y, 47M, 47C, and 47B of ribbon 34.

Upon color copying, paper sheet P is reciprocated a plurality of times corresponding to the number of colors upon rotation of platen 30. In this case, paper sheet P is guided onto first and second guide plates 49 and 50 sequentially arranged along the lower surface of discharge tray 48, which is mounted obliquely on body 1. This is performed by first and second selector gates 51 and 52 respectively arranged between platen 30 and first and second guide plates 49 and 50. More specifically, paper sheet P picked up from cassette 42 is conveyed through register rollers 43 and first selector gate 51, and its leading end portion is wound on platen 30. When platen 30 is rotated in the forward direction by a pulse motor (not shown), paper sheet P is conveyed at a predetermined speed, and heat generating elements (not shown) of thermal head 31 arranged in a dot line form along the axial direction of platen 30 are heated in accordance with a print signal, thereby transferring ink 47 on ribbon 34 onto paper sheet P. The leading end portion of paper sheet P passing through platen 30 is fed by second selector gate 52 located at a position indicated by a solid line in this case onto first guide plate 49 arranged along the lower surface of discharge tray 48. When the transfer operation of one color of ink 47 is completed, platen 30 is rotated in the reverse direction, so that paper sheet P is conveyed in the reverse direction and is returned to the transfer start position. In this case, the trailing end portion of paper sheet P is fed by first selector gate 51 pivotally deviated at a position indicated by an alternate long and two short dashed line onto second guide plate 50 arranged along the lower surface of first guide plate 49. In this manner, paper sheet P is reciprocated a plurality of times, and a plurality of colors are transferred. Paper sheet P, to which the transfer operation of all the colors of ink 47 is completed, is guided toward discharge rollers 53 by second selector gate 52 pivotally deviated at the position indicated by an alternate long and two short dashed line, and is discharged onto discharge tray 48 by discharge rollers 53.

When films for forming a press form are formed, a transfer operation is performed once without performing a reciprocal movement of paper sheet P, and paper sheet P subjected to the transfer operation is directly discharged onto discharge tray 48.

Figure 8:
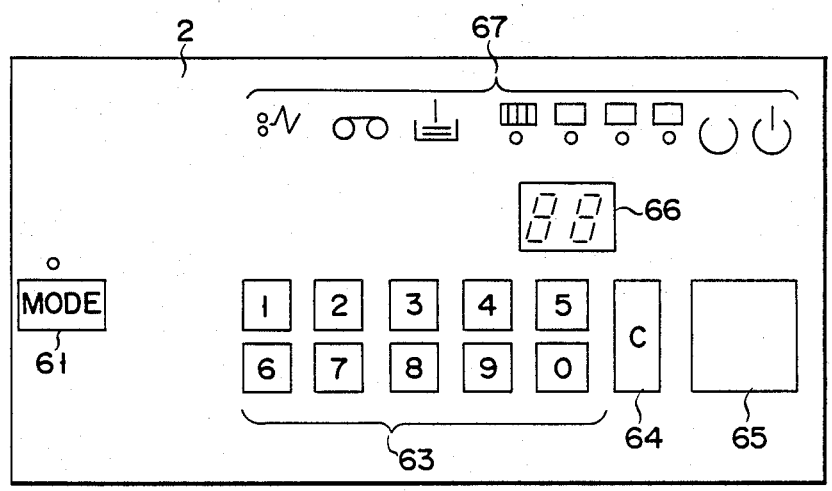

FIG. 8 shows operation panel 2. Panel 2 includes mode key 61 for selecting a normal mode (color copying mode) and a single color mode [film (block copy) formation mode for forming a press form], ten keys 63 for setting the number of copies, clear key 64 for clearing a preset number, copying key 65 for starting the copying operation, numerical display 66 for displaying the number of copies, status indicator portion 67 for indicating the operating state, and the like.

FIG. 9 schematically shows the entire control system having main controller 81 and first and second subcontrollers 82 and 83. Main controller 81 is connected to operation panel 2, correction circuit 84, luminance/color difference signal separator 85, image quality improving circuit 86, chrominance signal converter 87, binary circuit 88, first subcontroller 82, and second subcontroller 83, and controls these components. First subcontroller 82 is connected to light source controller 89, motor driver 90, photoelectric transducer 13, A/D converter 91, and resolution converter 92, and controls these components. Light source controller 89 is connected to illumination lamp 12, and controls its intensity. Motor driver 90 is connected to scanning motor 18 and drives it. Second subcontroller 83 is connected to thermal head temperature controller 93, thermal head 31, various detection switches 94, and driver 95, and controls these components. Driver 95 is connected to drive system 96 such as motors and solenoids, and drives them.

The signal flow in the arrangement shown in FIG. 9 will now be described. Light emitted from illumination lamp 12 and reflected by an original is focused on photoelectric transducer 13. Transducer 13 separates the light into cyan (C), green (G), and yellow (Y) analog chrominance signals, and sends these signals to A/D converter 91. A/D converter 91 converts these analog chrominance signals into digital signals, and sends the digital signals to resolution converter 92. Resolution converter 92 performs resolution conversion so that the resolution of transducer 13 coincides with that of thermal head 31, and sends the results to correction circuit 84. Correction circuit 84 performs correction processing for correcting variations in transducer 13 with respect to C, G, and Y chrominance signals sent from resolution converter 92, and sends the results to luminance/color difference signal separator 85. Circuit 85 performs various arithmetic operations of C, G, and Y chrominance signals sent from correction circuit 84, separates these signals into a luminance signal (I), color difference signal 1 (C1), and color difference signal 2 (C2), and sends these signals to image quality improving circuit 86. Circuit 86 analyzes the luminance signal and color difference signals 1 and 2 sent from circuit 85, and performs image quality improving processing such as edge emphasizing and character specifying processing. Then, circuit 86 sends these signals to chrominance signal converter 87. Converter 87 performs color conversion based on the luminance signal and color difference signals 1 and 2 subjected to image quality improving processing so as to convert them into any one of yellow (Y), magenta (M), cyan (C), and black (B) chrominance signals [primary colors (Y, M, C) upon printing+black (B)]. Converter 87 then sends the converted signal to binary circuit 88. Binary circuit 88 performs gradation conversion, i.e., binary conversion, with respect to the chrominance signal (any one of Y, M, C, and B) sent from chrominance signal converter 87, and sends the binary signal to thermal head temperature controller 93. Controller 93 sends a print signal to thermal head 31 based on the binary signal sent from binary circuit 88. Thermal head 31 performs printing (i.e., image formation) in accordance with the print signal.

Crominance signal converter 87 will be described in more detail with reference to FIG. 10. The luminance signal (I), color difference signal 1 (C1), and color difference signal 2 (C2) sent from image quality improving circuit 86 are sent to chrominance signal converter 87, and any of Y, M, C, and B chrominance signals is sent to binary circuit 88. The Y, M, C, and B chrominance signals are selected by main controller 81. More specifically, as shown in the table below, main controller 81 selects one of the Y, M, C, and B chrominance signals to be sent to binary circuit 88 in accordance with combinations of signals a and b. Note that the chrominance signals are automatically selected in the order of Y, M, C, and B in the normal color copying mode, and are automatically selected in the order of Y (positive), M (positive), C (positive), B (positive), Y (negative), M (negative), C (negative), and B (negative) in the single color mode.

|   | a | b |
|---|---|---|
| Y | 0 | 0 |
| M | 0 | 1 |
| C | 1 | 0 |
| B | 1 | 1 |

Figure 11:
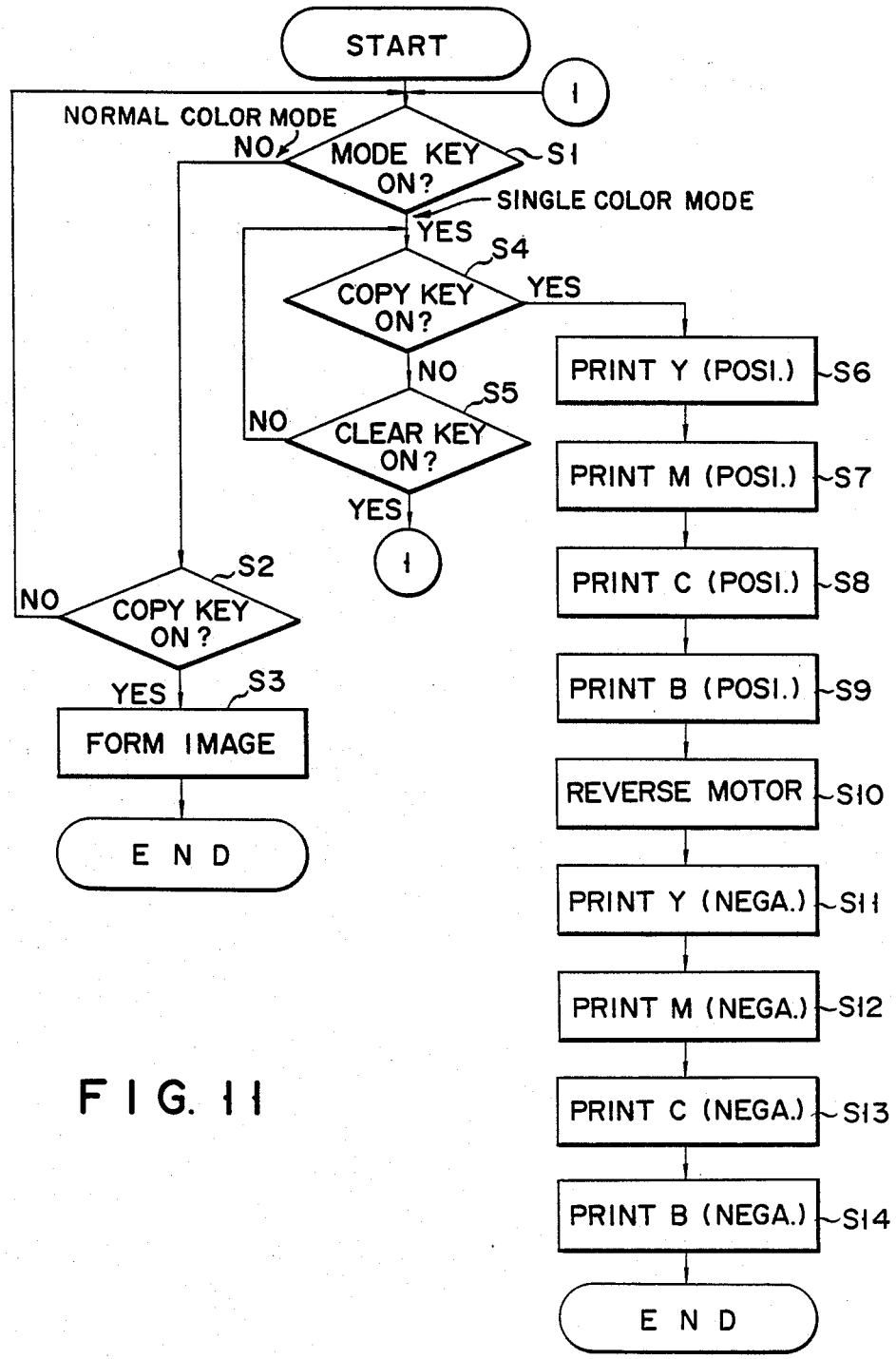

The operation will now be described with reference to the flow chart shown in FIG. 11. It is checked in step S1 if the single color mode is selected. If NO in step S1, since the normal color copying mode is selected, the flow advances to step S2. It is checked in step S2 if copying key 65 is turned on. If NO in step S2, the flow returns to step S1. If YES in step S2, the flow advances to step S3. In this case, since the color copying mode is selected, the color copying operation (image formation) is performed using ink ribbon 34 having a plurality of color inks by the above-mentioned operation.

If YES in step S1, i.e., if the single color mode is selected, since the formation mode of a film for forming a press form is selected, the flow advances to step S4. It is checked in step S5 if the single color mode is cleared upon turning on of mode key 61. If YES in step S5, the flow returns to step S1; otherwise, the flow returns to step S4. It is checked in step S4 if copying key 65 is turned on. If NO in step S4, the flow advances to step S5; otherwise, the flow advances to step S6. In steps S6 to S10, the color copying operation as described above is performed.

More specifically, in step S6, controller 81 instructs chrominance signal converter 87 to perform conversion to the yellow (Y) chrominance signal, and image formation for a yellow component of an original image is performed using ink 47Y of ink ribbon 34. Thus, printing (positive) for the yellow component of the original image is performed, and the flow advances to step S7.

In step S7, controller 81 instructs chrominance signal converter 87 to perform conversion to the magenta (M) chrominance signal, and image formation for a magenta component of the original image is performed using ink 47M of ink ribbon 34 on paper sheet P on which the yellow (Y) image is formed. Thus, printing (positive) for the magenta component of the original image is performed, and the flow advances to step S8.

In step S8, controller 81 instructs chrominance signal converter 87 to perform conversion to the cyan (C) chrominance signal, and image formation for a cyan component of the original image is performed using ink 47C of ink ribbon 34 on paper sheet P on which the magenta (M) image is formed. Thus, printing (positive) for the cyan component of the original image is performed, and the flow advances to step S9.

In step S9, controller 81 instructs chrominance signal converter 87 to perform conversion to the black (B) chrominance signal, and image formation for a black component of the original image is performed using ink 47B of ink ribbon 34 on paper sheet P on which the cyan (C) image is formed. Thus, printing (positive) for the black component of the original image is performed, and the flow advances to step S10.

As a result, color copying, i.e., printing of a finished image as shown in FIG. 12B is performed with respect to an original image shown in FIG. 12A.

In step S10, drive system 96 is controlled, so that the feed direction of ink ribbon 34 is reversed and the ribbon is returned by a distance corresponding to the four ink portions. Then, the flow advances to step S11. In steps S11 to S14, films for forming a press form are formed by using the portion of ink ribbon 34 subjected to the above-mentioned color copying operation.

More specifically, in step S11, controller 81 instructs thermal head temperature controller 93 to drive the overall head 31, and image formation is performed using ink portion 47Y of ink ribbon 34 with which a positive image of the original was printed. Thus, a negative image of a yellow component of the original image is formed on a first plastic film or paper sheet. Therefore, a film for a press form corresponding to the yellow component of the original image can be obtained, and the film is printed in yellow, as shown in FIG. 12C. Then, the flow advances to step S12.

In step S12, controller 81 instructs controller 93 to drive the overall head 31, and image formation is performed using ink portion 47M of ink ribbon 34 with which a positive image of the original was printed. Thus, a negative image of a magenta component of the original image is formed on a second plastic film or paper sheet. Therefore, a film for a press form corresponding to the magenta component of the original image can be obtained, and the film is printed in magenta, as shown in FIG. 12D. Then, the flow advances to step S13.

In step S13, controller 81 instructs controller 93 to drive the overall head 31, and image formation is performed using ink portion 47C of ink ribbon 34 with which a positive image of the original was printed. Thus, a negative image of a cyan component of the original image is formed on a third plastic film or paper sheet. Therefore, a film for a press form corresponding to the cyan component of the original image can be obtained, and the film is printed in cyan, as shown in FIG. 12E. Then, the flow advances to step S14.

In step S14, controller 81 instructs controller 93 to drive the overall head 31, and image formation is performed using ink portion 47B of ink ribbon 34 with which a positive image of the original was printed. Thus, a negative image of a black component of the original image is formed on a fourth plastic film or paper sheet. Therefore, a film for a press form corresponding to the black component of the original image can be obtained, and the film is printed in black, as shown in FIG. 12F. Then, the processing is ended.

In this embodiment, after a finished image for inspection is copied, the films for a press form are printed. However, the finished image can be copied after the films for a press form are printed.

As described above, the finished image is printed, and the films for forming a press form corresponding to respective colors are printed. More specifically, after the four-full-color copying operation is performed, the thermal transfer ink ribbon is rewound, and images left on the respective ink portions are transferred to separate paper sheets, so that negative images of an original can be formed. In this manner, the finished image corresponding to the films for forming the press form and finished colors can be inspected.

In the above embodiment, the mode key is arranged on the operation panel, and the mode is switched by the mode key. However, the present invention is not limited to this. For example, the ten keys arranged on the operation panel can be utilized to input a mode switching code, thereby switching the modes.

A case has been described wherein the finished image is copied and, subsequently, the printing operation of films for a print form is performed. The present invention is not limited to this. After a finished image is copied and is inspected, a confirmation key can be turned on to perform printing of films for a press form.

Films for a press form corresponding to positive and negative images of respective colors may be printed. In this case, the same portion of a thermal transfer ink ribbon can be used for positive or negative images, and the ink ribbon can be saved.

According to the present invention as described above, an image forming apparatus can be provided wherein an actual finished image formed by films for forming a press form can be inspected and confirmed upon formation of the films.

The principal part of the second embodiment of the present invention will now be described. In the first embodiment described above, when the negative films for forming the press form are formed, positive images (color images) are formed by sequentially transferring respective yellow, magenta, cyan, and black ink portions 47Y, 47M, 47C, and 47B of ink ribbon 34 onto single paper sheet P so that a finished image to be formed by the negative films for the press form can be inspected and confirmed in advance.

When both positive and negative films for the press form must be formed, the positive images for the respective colors can be formed on separate plastic films (or paper sheets) respectively by ink portions 47Y, 47M, 47C, and 47B of ink ribbon 34 instead of forming the positive images (color copying) on single paper sheet P, as shown in FIGS. 13A to 13D. Thus, the positive films for the respective colors can be formed. Thereafter, steps for forming the negative films for the respective colors using the same ink ribbon as in the positive film formation are the same as those in the first embodiment.

In the second embodiment, the negative films for the respective colors are first formed, and thereafter, the positive films for the respective colors can be formed using the same ink ribbon 47 as in the formation of the negative films.

According to the second embodiment described above, negative and positive images can be obtained from a unit amount of a transfer medium.

Therefore, according to the present invention, in both the first and second embodiment, even if the used transfer medium is finally disposed, the entire ink portion of the transfer medium has already been transferred. Therefore, accidental disclosure of confidential information cannot occur, unlike in the conventional apparatus, and the present invention can contribute to the effective use of resources.

What is claimed is:

1. A positive and negative image forming apparatus comprising:
    color image data output means for outputting color image data including image forming signal components of a plurality of colors corresponding to positive and negative images to be formed;
    image forming means for selectively transferring positive and negative images onto a predetermined number of image forming media using a transfer medium having a plurality of sets of color portions corresponding to the image forming signal components;
    first control means, coupled to said color image data output means and said image forming means, for in a first image formation mode of said image forming means, outputting a first predetermined number of control signals for transferring a positive image onto a single one of said predetermined number of image forming media using a predetermined set of color portions of said transfer medium in accordance with the image forming signal components of the plurality of colors included in the color image data; and
    second control means, coupled to said color image data output means and said image forming means, for, in a second image formation mode of said image forming means, outputting a second predetermined number of control signals for sequentially transferring negative images onto corresponding ones of the remainder of said predetermined number of image forming media using the predetermined set of color portions of said transfer medium.

2. An apparatus according to claim 1, wherein the second predetermined number of control signals sequentially transfer the negative images by using the color portions of the predetermined set of color portions of said transfer medium as negative images after the predetermined set of color portions has been used in the first image formation mode, and by sequentially transferring the color portions of the predetermined set of color portions of said transfer medium onto corresponding ones of the remainder of said predetermined number of image forming media.

3. An apparatus according to claim 1, wherein the color image data includes yellow, magenta, and cyan color image forming signal components.

4. An apparatus according to claim 3, wherein the color image data further includes a black color image forming signal component.

5. An apparatus according to claim 3, wherein said transfer medium includes color portions of yellow, magenta, and cyan.

6. An apparatus according to claim 5, wherein the color image data further includes a black color image forming signal component, and wherein said transfer medium further includes a color portion of black.

7. An apparatus according to claim 1, wherein said transfer medium comprises a thermal transfer medium.

8. An apparatus according to claim 1, wherein said predetermined number of image forming media comprise one of a paper sheet and a plastic film.

9. A positive and negative image forming apparatus comprising:
    color image data output means for outputting color image data including image forming signal components of a plurality of colors corresponding to positive and negative images to be formed;
    image forming means for selectively transferring positive and negative images onto a predetermined number of image forming media using a transfer medium having a plurality of sets of color portions corresponding to the image forming signal components;
    first control means, coupled to said color image data output means and said image forming means, for, in a first image formation mode of said image forming means, outputting a first predetermined number of control signals for sequentially transferring positive images onto corresponding ones of a plurality of said predetermined number of image forming media using a predetermined set of color portions of said transfer medium in accordance with the image forming signal components of the plurality of colors included in the color image data; and
    second control means, coupled to said color image data output means and said image forming means, for, in a second image formation mode of said image forming means, outputting a second predetermined number of control signals for sequentially transferring negative images onto corresponding one of the remainder of said predetermined number of image forming media using the predetermined set of color portions of said transfer medium.

10. An apparatus according to claim 9, wherein the second predetermined number of control signals sequentially transfer the negative images by using the color portions of the predetermined set of color portions of said transfer medium as negative images after the predetermined set of color portions of said transfer medium has been used in the first image formation mode, and by sequentially transferring the color portions of the predetermined set of color portions of said transfer medium onto corresponding ones of the remainder of said predetermined number of image forming media.

11. A positive and negative image forming method comprising the steps of:
    outputting color image data including image forming signal components of a plurality of colors corresponding to positive and negative images to be formed;

in a first image formation mode, transferring a positive image onto a single image forming medium using a predetermined set of color portions of a transfer medium having a plurality of sets of color portions corresponding to the image forming signal components in accordance with the image forming signal components of the plurality of colors included in the color image data; and in a second image formation mode, sequentially transferring negative images onto corresponding ones of a plurality of image forming media using the predetermined set of color portions of said transfer medium.

12. An image forming apparatus comprising:

scanning means for optically scanning an original and obtaining a plurality of types of chrominance signals;

color conversion means for converting the chrominance signals obtained by said scanning means to obtain image forming signals of a plurality of colors; and image forming means for forming a positive image of the plurality of colors onto a signal image forming medium using a transfer medium having portions of the plurality of colors in accordance with the image forming signals of the plurality of colors obtained by said color conversion means, and for forming negative images of the plurality of colors onto corresponding ones of a plurality of image forming media separate from the single image forming medium using corresponding ones of the portions of the plurality of colors of said transfer medium.

13. An apparatus according to claim 12, wherein the plurality of types of chrominance signals include signals of three colors of cyan, green, and yellow or red, green, and blue.

14. An apparatus according to claim 12, wherein the plurality of types of chrominance signals include signals of four colors of yellow, magenta, cyan, and black or signals of three colors of yellow, magenta, and cyan.

15. An apparatus according to claim 12, wherein said transfer medium having portions of the plurality of colors has four portions of yellow, magenta, cyan, and black or three portions of yellow, magenta, and cyan.

16. An apparatus according to claim 12, wherein said transfer medium comprises a thermal transfer ribbon.

17. An apparatus according to claim 12, wherein said single image forming medium and said plurality of image forming media comprise at least one of a paper sheet and a plastic film.

18. An apparatus according to claim 12, wherein said negative images formed on said plurality of image forming media are used for forming press forms for offset printing.

19. A positive and negative image forming method comprising the steps of:

outputting color image data including image forming signal components of a plurality of colors corresponding to positive and negative images to be formed;

in a first image formation mode, sequentially transferring positive images onto corresponding ones of a first plurality of image forming media using a predetermined set of color portions of a transfer medium having a plurality of sets of color portions corresponding to the image forming signal components in accordance with the image forming signal components of the plurality of colors included in the color image data; and in a second image formation mode, sequentially transferring negative images onto corresponding ones of a second plurality of image forming media using the predetermined set of color portions of said transfer medium.

* * * * *